US012602056B2

(12) United States Patent
Helfgott et al.

(10) Patent No.: US 12,602,056 B2
(45) Date of Patent: Apr. 14, 2026

(54) AUTONOMOUS VEHICLE SOCIALIZATION

(71) Applicant: GM Cruise Holdings LLC, San Francisco, CA (US)

(72) Inventors: Matthew Douglas Helfgott, San Francisco, CA (US); Jennifer Devar McKnew, Petaluma, CA (US); Max Eunice, San Francisco, CA (US); Spencer Lee James, Santa Clara, CA (US); Alexander Willem Gerrese, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 62 days.

(21) Appl. No.: 18/512,147

(22) Filed: Nov. 17, 2023

(65) Prior Publication Data

US 2025/0165000 A1 May 22, 2025

(51) Int. Cl.
| | |
|---|---|
| *G05D 1/246* | (2024.01) |
| *G05D 1/646* | (2024.01) |
| *G05D 1/698* | (2024.01) |
| *G05D 109/10* | (2024.01) |

(52) U.S. Cl.
CPC ............ *G05D 1/246* (2024.01); *G05D 1/646* (2024.01); *G05D 1/6987* (2024.01); *G05D 2109/10* (2024.01)

(58) Field of Classification Search
CPC ...... G05D 1/246; G05D 1/646; G05D 1/6987; G05D 2109/10
See application file for complete search history.

(56) References Cited

U.S. PATENT DOCUMENTS

| | | | |
|---|---|---|---|
| 8,098,170 B1 * | 1/2012 | Szczerba | G02B 27/01 |
| | | | 340/905 |
| 11,178,210 B2 * | 11/2021 | Choiniere | H04L 67/06 |
| 2018/0143649 A1 * | 5/2018 | Miao | G08G 1/096741 |

(Continued)

OTHER PUBLICATIONS

Unpublished U.S. Appl. No. 18/467,542, filed Sep. 14, 2023.

*Primary Examiner* — Thomas Ingram
(74) *Attorney, Agent, or Firm* — Honigman LLP; Matthew H. Szalach; Jonathan P. O'Brien

(57) ABSTRACT

Systems and methods for providing opportunities for interactions and communication between vehicles and passengers. In particular, a vehicle socialization platform is provided for facilitating a wide range of social and utilitarian exchanges between vehicles and their occupants, thus providing a community of interconnected vehicles. Vehicle interactions can include passive communication, including vehicles from a particular fleet acknowledging other fleet vehicles without intervention from a passenger or user. Vehicle interactions can include active communication, in which passengers are engaged with and have some control over vehicle communications through dedicated experiences provided in a ridehail application or on an in-vehicle tablet. In particular, some experiences can become dynamically available based on the fleet vehicle's proximity to another fleet vehicle. The vehicle socialization platform is a smart socialization platform that enables two-way communication between vehicles and passengers, facilitating a wide range of social and utilitarian exchanges between vehicles and vehicle occupants.

20 Claims, 10 Drawing Sheets

<u>100</u>

(56)     References Cited

U.S. PATENT DOCUMENTS

| | | | |
|---|---|---|---|
| 2019/0063941 A1* | 2/2019 | Walenty | G06Q 10/047 |
| 2019/0130874 A1* | 5/2019 | Wafford | B60K 35/10 |
| 2019/0197430 A1* | 6/2019 | Arditi | G16H 50/20 |
| 2019/0227553 A1* | 7/2019 | Kentley-Klay | B60Q 3/00 |
| 2020/0084193 A1* | 3/2020 | Beaurepaire | G05D 1/0287 |
| 2021/0326481 A1* | 10/2021 | Mendes | G06F 21/64 |
| 2022/0068140 A1* | 3/2022 | Brandon | G06Q 50/01 |
| 2022/0185110 A1* | 6/2022 | Chandrasekaran | B32B 17/10761 |
| 2022/0234446 A1* | 7/2022 | Nazarov | B60R 13/10 |
| 2022/0301232 A1* | 9/2022 | Park | G06T 11/00 |

* cited by examiner

300

400

402
DISPLAY A MAP SHOWING A FIRST AV AND A HIGHLIGHTED ZONE AROUND THE FIRST AV

404
IDENTIFY OTHER FLEET AVS IN THE HIGHLIGHTED ZONE AND SHOW OTHER FLEET AVS IN THE HIGHLIGHTED ZONE ON THE MAP

406
RECEIVE A PASSENGER SELECTION FOR A SECOND AV IN THE HIGHLIGHTED ZONE

408
RECEIVE A PASSENGER SELECTION OF A SOCIAL ACTION TO PERFORM FOR THE SECOND AV

410
PERFORM THE SOCIAL ACTION

700

900

AUTONOMOUS VEHICLE SOCIALIZATION

BACKGROUND

1. Technical Field

The present disclosure generally relates to vehicle interactions, and, more specifically, to vehicle to vehicle communication.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
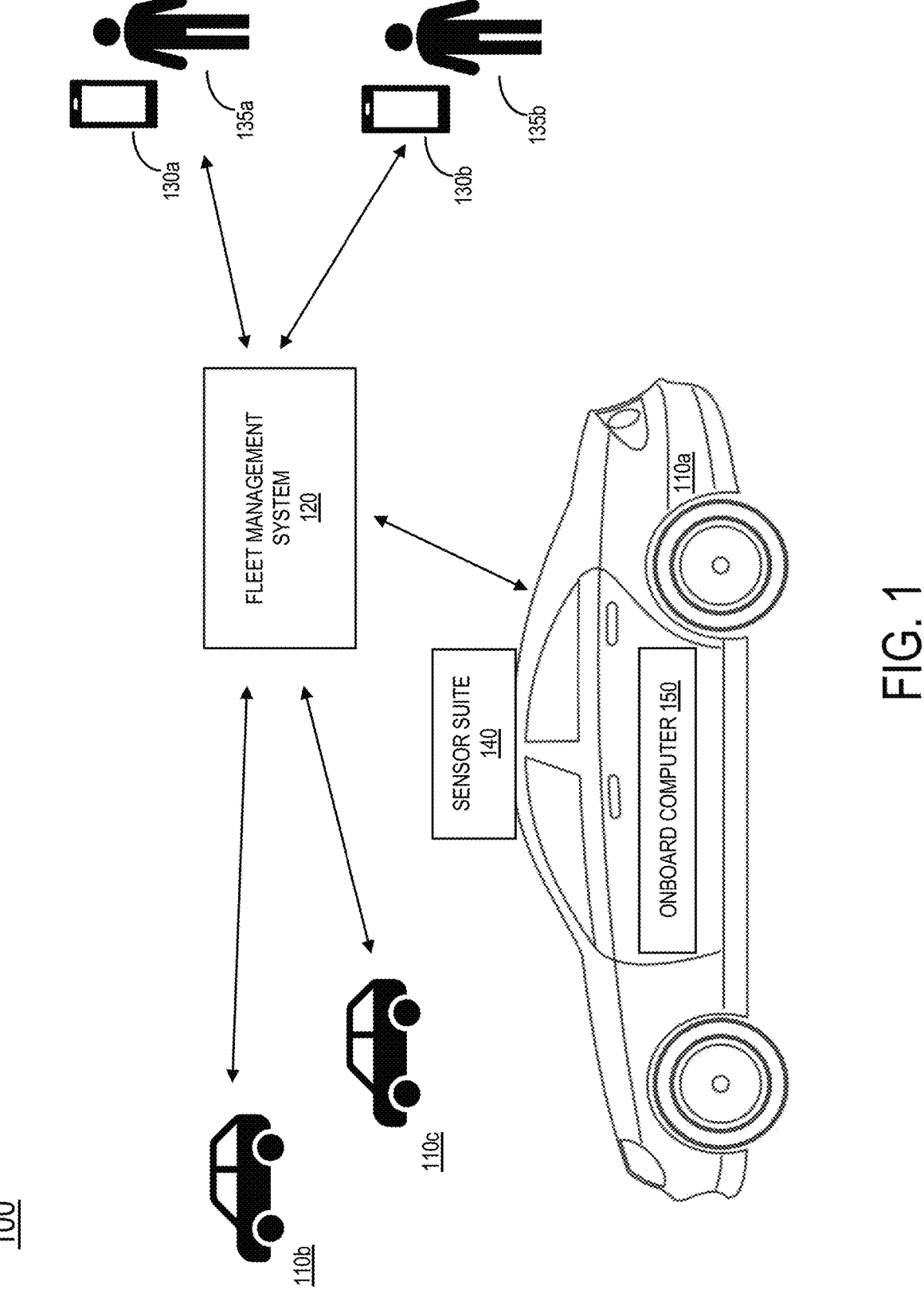
FIG. 1 is a block diagram illustrating a system including a fleet of autonomous vehicles (AVs) that can implement a vehicle socialization platform, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview Autonomous vehicles provide driverless ride services, allowing a user to request a ride from a pick-up location to a destination location. With the autonomous driving features of the autonomous vehicle, the user is a passenger in the vehicle and there is no human driver. The autonomous vehicle can navigate from the pick-up location to the drop-off location with no or little user input. As such, autonomous vehicles can be isolating and anti-social entities-enclosed spaces that separate the passenger from others, including the outside world and other vehicles. Systems and methods are presented for providing opportunities for interactions and communication between vehicles, between passengers, between vehicles and pedestrians, and between vehicles and passengers of other vehicles. In particular, a vehicle socialization platform is provided for facilitating a wide range of social and utilitarian exchanges between vehicles and their occupants, thus providing a community of interconnected vehicles.

Vehicle interactions can include passive communication, including vehicles from a particular fleet acknowledging other fleet vehicles without intervention from a passenger or user. Passive communication can include waving windshield wipers, playing an audio chime, and/or presenting an on-screen greeting, compliment, or animation. In some examples, various technologies can be utilized to predict when one fleet vehicle's path will cross another fleet vehicle's path and enable the passive communication behaviors. The technology can include, for example, shared mapping system systems, vehicle sensors, and a central fleet management system.

Vehicle interactions can include active communication, in which passengers are engaged with and have some control over vehicle communications through dedicated experiences provided in a ridehail application or on an in-vehicle tablet. In particular, some experiences can become dynamically available based on the fleet vehicle's proximity to another fleet vehicle. Using the vehicle interaction platform, a passenger can cause certain vehicle behaviors to surprise and delight other fleet vehicle passengers or other road users, such as sending an emoji to an in-vehicle screen in a neighboring fleet vehicle, sending an on-screen greeting, compliment, or animation for presentation on an exterior display, or selecting another vehicle greeting or acknowledgment for communication outside the vehicle. In some examples, passengers can have a minor and playful effect on vehicle driving behavior.

The vehicle socialization platform presented herein provides an opportunity for both practical and fun interactions between vehicles and passengers. In some examples, the vehicle socialization platform is a smart socialization platform that enables two-way communication between vehicles and passengers, facilitating a wide range of social and utilitarian exchanges between vehicles and vehicle occupants. In some examples, the platform allows vehicles to communicate with other vehicles or people through passenger-initiated waves, winks, or other actions. The vehicle socialization platform enables both passive and active vehicle communication. In general, as used herein, "vehicle socialization platform" refers to a system for non-utilitarian vehicle communication, including communication for entertainment purposes, socialization purposes, greetings, and other optional transmissions and/or interactions. The communications can include vehicle communications to other vehicles, vehicle communications to other road users and/or pedestrians, and vehicle communications to passengers in other vehicles. In some examples, the vehicle communications are initiated by the vehicle itself (such as by a vehicle onboard computer), and in other examples, the vehicle communications are initiated by a vehicle passenger.

Example AV System for Vehicle Socialization

FIG. 1 illustrates a system 100 including a fleet of AVs that can implement a vehicle socialization platform, according to some embodiments of the present disclosure. The system 100 includes AVs 110a, 110b, 110c (collectively referred to as "AVs 110" or "AV 110"), a fleet management system 120, and client devices 130a and 130b (collectively referred to as "client devices 130" or "client device 130"). The client devices 130a and 130b are associated with users 135a and 135b, respectively. The AV 110a includes a sensor suite 140 and an onboard computer 150. Even though not shown in FIG. 1, the AV 110b or 110c can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110a) to perform a particular service, and instructs the selected AV to drive to one or more particular locations associated with the service (e.g., a first address to pick up user 135a, and a second address to pick up user 135b). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135a accesses an app executing on the client device 130a and requests a ride from a pickup location (e.g., the current location of the client device 130a) to a destination location. The client device 130a transmits the ride request to the fleet management system 120. The fleet management system 120 selects an AV 110 from the fleet of AVs 110 and dispatches the selected AV 110a to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 can also record the pick-up and drop-off locations of users 135 and maintain a ride history and/or a location history for each user 135 in a user database and/or a map database.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130. In some examples, when a user 135 is a passenger in a vehicle 110, a client device 130 executes an application allowing the user 135 of the client device 130 to interact with the vehicle 110 that the user 135 is a passenger in.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors. In various examples, the UI may allow the user 135 to provide passenger-initiated communication from the AV 110 over a vehicle socialization platform.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

In various implementations, the AV 110 includes a throttle interface that controls an engine throttle, motor speed (e.g., rotational speed of electric motor), or any other movement-enabling mechanism. In various implementations, the AV 110 includes a brake interface that controls brakes of the AV 110 and controls any other movement-retarding mechanism of the AV 110. In various implementations, the AV 110 includes a steering interface that controls steering of the AV 110. In one example, the steering interface changes the angle of wheels of the AV. The AV 110 may additionally or alternatively include interfaces for control of any other vehicle functions, for example, windshield wipers, headlights, turn indicators, air conditioning, etc.

The sensor suite 140 may include a computer vision ("CV") system, localization sensors, and driving sensors. For example, the sensor suite 140 may include interior and exterior cameras, photodetectors, radio detection and ranging (RADAR), sound navigation and ranging (SONAR), LIDAR, Global Positioning System (GPS), thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 8.

In some examples, the sensor suite 140 includes cameras implemented using high-resolution imagers with fixed mounting and field of view. In further examples, the sensor suite 140 includes LIDARs implemented using scanning LIDARs. Scanning LIDARs have a dynamically configurable field of view that provides a point cloud of the region intended to scan. In still further examples, the sensor suite 140 includes RADARs implemented using scanning RADARS with dynamically configurable field of view.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. Additionally, vehicle passengers can engage with the vehicle socialization platform via an in-vehicle tablet, an in-vehicle screen, and/or via a ridehail application on the passenger's mobile device.

Example Fleet Management System

Figure 2:
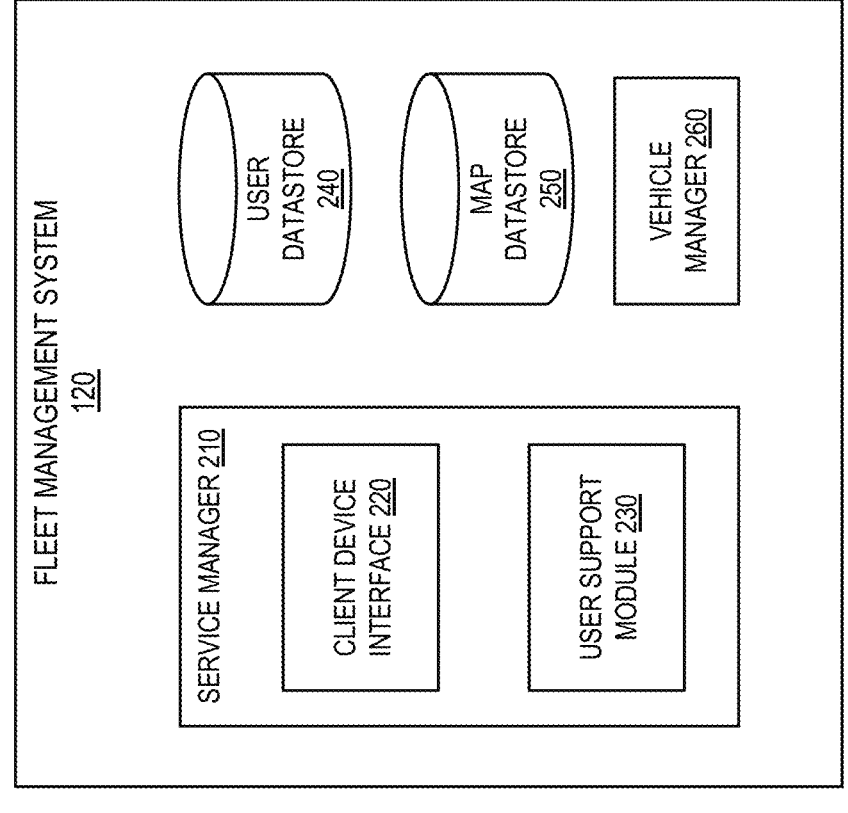
FIG. 2 is a block diagram showing the fleet management system, according to some embodiments of the present disclosure, according to some examples of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in a shared ride with one or more other passengers not known to the user. In some examples, the client device interface 220 provides an app for a vehicle socialization platform, allowing a user to provide input regarding vehicle social actions and vehicle social communications.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 340 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that has not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. The historical data of the user may also include information associated with communications of AVs with the user for AV behaviors in historical rides taken by the user. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user preferences associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240. As another example, a learning module may learn user tolerance or preference for AV behaviors, e.g., based on information associated with communications of AVs with the user for AV behaviors in historical rides taken by the user. The learning module may learn that the user has a high tolerance for an AV behavior based on information indicating that the user had no bad feelings for the AV behavior undesirable in one or more previous rides. Similarly, the learning module may learn that the user has a low tolerance for a type of AV behavior based on information indicating that the user had negative sentiments towards the AV behavior in one or more previous rides. In some examples, the learning module may learn the types of vehicle social communications the user prefers and present options for vehicle social actions based on learned user preferences.

The map datastore 250 stores one or more maps of environments through which the AVs 110 may travel. A map may be a semantic map or vector map. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 310 of the AVs 110 may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV 110 interface 290. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage. As another example, the vehicle manager 260 may include functionalities of the onboard computer 150, such as functionalities related to modeling restricted traffic zones.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Example Method for Vehicle Social Actions

Figure 3:
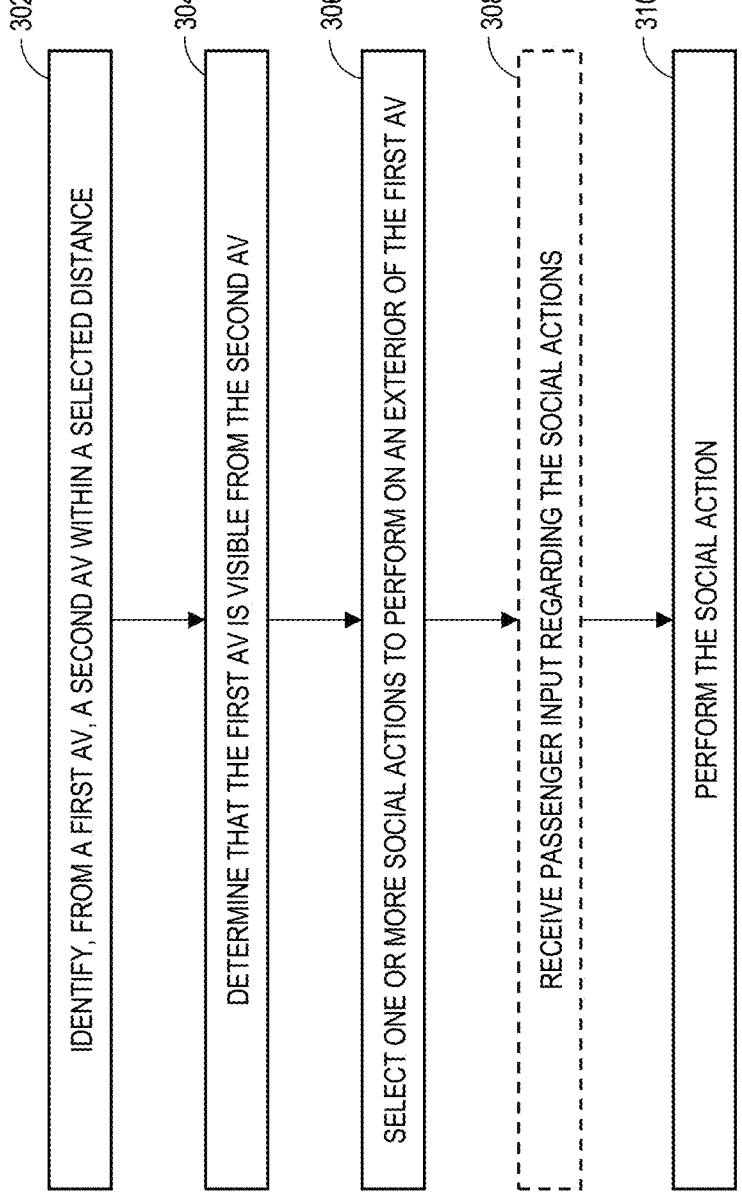
FIG. 3 is flow chart illustrating an example of a method for vehicle social actions including communication with other vehicles, according to various examples of the present disclosure.

FIG. 3 is flow chart illustrating an example of a method 300 for vehicle social actions including communication with other vehicles, according to various examples of the present disclosure. In particular, the method 300 is a method for a vehicle to passively and/or actively communicate with another road user. In some examples, the method 300 can be used for vehicles in a fleet of vehicles to communicate with each other. Passengers in the vehicles can be provided with an opportunity to influence the interactions and social communication between vehicles.

At step 302, a first AV identifies a second AV within a selected distance of the first AV. In general, the social communications described herein are communications between vehicles in close proximity to one another. At step 304, the first AV determines that the first AV is visible from the second AV. In particular, the first AV can determine that the first AV is visible from a passenger cabin in the second AV, and thus that a passenger in the second AV may be able to see the first AV.

In some examples, the first and second AVs both communicate with a central computer. In some examples, the central computer is part of a fleet management system such as the fleet management system 120. In some examples, the fleet management system 120 can provide information to the first AV indicating that the path of the first AV will cross the path of the second AV. In some examples, the fleet management system 120 can provide information to the first AV indicating that the path of the first AV will coincide with the path of the second AV for a certain distance.

Thus, in one example, the first AV can receive an alert from a fleet management system that its path will intersect and/or coincide with the path of the second AV. At step 304, the first AV can determine that the first AV is visible from the second AV. At step 206, the first AV can select one or more social actions to perform on an exterior of the first AV. The social actions can be actions that are visible from the second AV, and the social actions can be visible to other road users as well as pedestrians. In some examples, the social actions are performed when the first and second AVs pass each other.

In various examples, the social actions can be actions that indicate a friendly greeting. An exemplary social action can include waving the windshield wipers of the first AV, such as by extending the wipers away from the windshield and waving the wipers back and forth so as to wave to the second AV. Another social action can be flashing the lights of the first AV, such as flashing high beam lights and/or headlights. In another example, a social action can include projecting a hand-waving animation on an exterior of the vehicle, such as on an exterior vehicle screen and/or display. In one example, a hand-waving animation can be displayed when the first and second AVs are stopped next to each other on a road, such as at a traffic light, stop sign, or in traffic. The social action can include other animations to indicate a greeting such as a waving emoji, a winking emoji, another picture, and/or text. In one example, the social action is a horn honk. In another example, the social action can include an audible chime to say hello. In one example, the first and second AVs can both produce alternating chimes that are the alternating notes of a song, thus creating a joint greeting. Similarly, the first and second AVs can each produce chimes that together create a single song or tune, such as the first AV producing a beat while the second AV produces a tune, or the first AV producing a melody while the second AV produces a harmonic. Another example of a social action includes turning the vehicle wheels back and forth to signal playful behavior. In another example, a social action is making the AV bounce. An AV can include a mechanism to cause it to bounce, and in some examples, an AV subwoofer can cause the AV to bounce.

Optionally, at step 308, the first AV can receive passenger input regarding the one or more social actions selected at step 306. For instance, the passenger can choose one of the social actions for the first AV to perform. In another example, the passenger can indicate a preference that the first AV does not perform any social actions. In some examples, the one or more social actions can include categories of social actions, and the passenger can select a specific social action from a category (e.g., a specific animation for projection on an exterior display, a specific audible chime or tune to emit). In some implementations, the method 300 skips step 308, and the social action selection is a passive communication selected by the first AV with no input from the passenger. In some examples, the passenger has opted-in to allow the AV the passenger is traveling in to passively select and perform social actions.

At step 310, the first AV performs the social action. Step 310 can be performed at a specific time such that a passenger in the second AV is in an optimal position to see the social action performed by the first AV. For example, the first AV can perform the social action when it is stopped at a four-way stop and the second AV pulls up to the four-way stop from another direction. In another example, the first AV can perform the social action when it is stopped at a traffic light, and the second AV pulls up and stops at the traffic light next to the first AV. In some examples, the first AV can perform the social action when the second AV is driving alongside the first AV or driving behind the first AV. The social action can be selected based, in part, on the social action being visible from the second AV. Thus, for example, the first AV would not wave its windshield wipers at the second AV if the second AV is behind the first AV.

In some examples, data from other AVs can be used to provide additional context to the first AVs perception stack and decision-making module for selecting and performing the social action.

Figure 4:
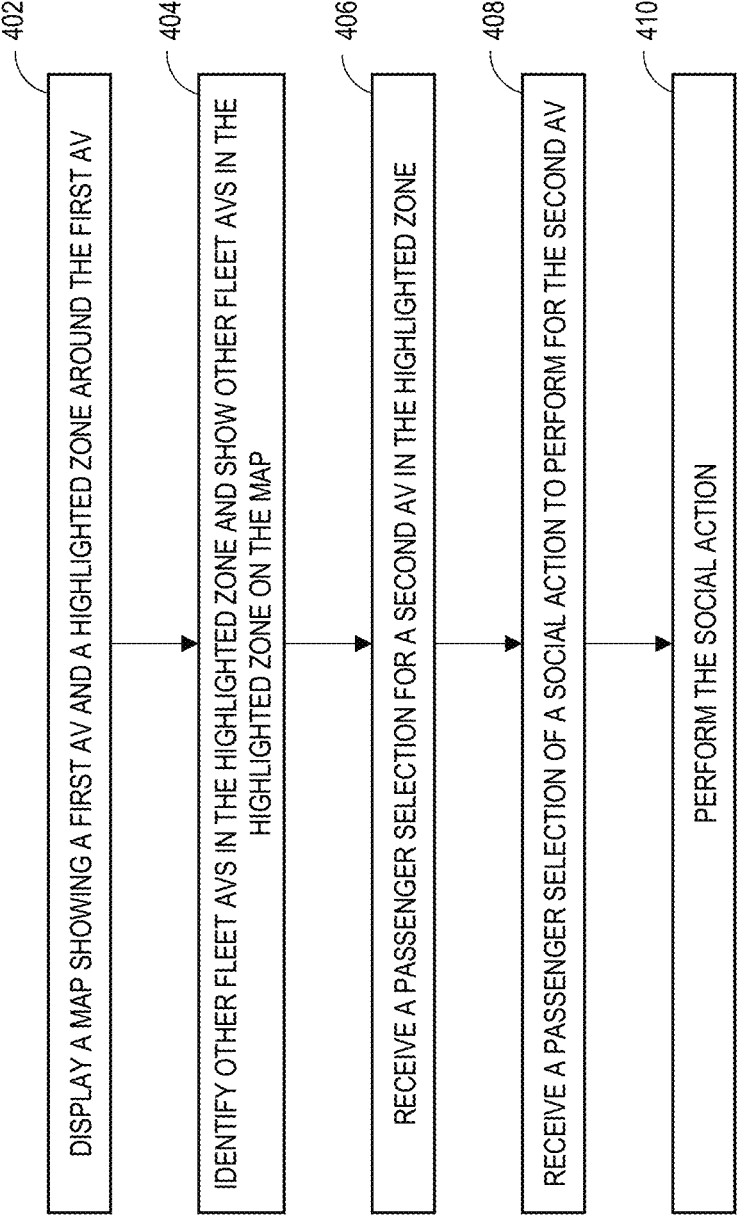
FIG. 4 is a flow chart illustrating an example of a method for passenger-initiated vehicle social actions including communication with other vehicles, according to some embodiments of the disclosure.

In some examples, social actions performed by an AV can be passenger-initiated actions. FIG. 4 is a flow chart illustrating an example of a method 400 for passenger-initiated vehicle social actions including communication with other vehicles, according to various examples of the present disclosure. In various implementations, the vehicle socialization platform provides the opportunity for passengers in a fleet AV to interact with other passengers in other fleet AVs using dedicated in-app and/or in-AV social action options. In various examples, the social action options become dynamically available depending on the passenger AV's proximity to other AVs. In some examples, passengers can opt-in to participate in these social action experiences. In some examples, ridehail users can opt-in or opt-out of these social action experiences in a user ridehail account.

In some examples, the socialization platform selects one other AV for the first AV to interact with, such that passengers in the first AV are not overwhelmed with options. The other AV can be selected randomly, or the other AV can be selected strategically. Strategic selection can be based on previous interactions, the length of the expected overlap in proximity based on routing of the first AV and the other AV, the theme name of the other AV, or any other selection criteria. When the socialization platform selects another AV for an interaction, the passenger in the first AV can be given an option to initiate a specific interaction with the other AV (e.g., "send an emoji to [the other AV]") instead of being given an option to select another AV to interact with. In some examples, after a socialization platform interaction with another AV, the socialization platform initiates a cool down period during which no interaction requests can be sent or received.

At step 402, a map is displayed in a first AV, showing the first AV and a highlighted zone around the first AV. In some examples, the highlighted zone includes an area that is visible from the first AV. In some examples, the highlighted zone is an area in close proximity to the first AV. In some examples, the highlighted zone includes an area in which the AV is headed. The highlighted zone can move with the AV so that as the AV drives, the zone changes.

At step 404, other fleet AVs in the highlighted zone are identified, and the other fleet AVs in the highlighted zone are shown on the map. In some examples, other fleet AVs in the map area are shown on the map, and the areas of the map that are not in the highlighted zone are grayed out or darkened.

In some examples, the first AV identifies other fleet AVs in the highlighted zone (and/or on the map). In some examples, the first AV receives information about other AVs in the highlighted zone (and/or on the map) from a fleet management service, such as the fleet management service 120 described above with respect to FIG. 2. In some examples, only fleet AVs containing passengers are shown. In some examples, only fleet AVs having passengers that have opted in to participating in social actions are shown on the map, while fleet AVs having passengers that have not opted in (or have opted out) of social actions are not shown on the map.

In some examples, the highlighted zone is a temporary interactivity zone, since passengers in the AV can interact with other AVs (and other passengers in other AVs) within the highlighted zone. In this manner, two or more AVs are connected because they are in the same interactivity zone, for example because they are adjacent to each other. In some examples, based on routing data, it can be predicted when two AVs interactivity zones will overlap and how long the two AVs interactivity zones will overlap for. In some examples, a passenger in a first AV can request that the first AV drive in such a manner that the interactivity zone of the first AV continues to overlap with the interactivity zone of a second AV for longer than initially planned.

The highlighted zone is temporary as it changes when the AV moves. In some examples, the highlighted zone is a hitbox-style zone, meaning that it is the area within which the first AV can have effects on other AVs. In some examples, other AVs in the highlighted zone are also able to perform social actions on the first AV. The highlighted zone is discussed in greater detail with respect to FIGS. 5A and 5B

At step 406, a passenger selection is received from a passenger in the first AV, wherein the passenger selection includes a second AV. In particular, the passenger selection is the AV that the passenger elects to send a social action to. At step 408, a passenger selection is received from a passenger in the first AV, wherein the passenger selection includes a social action to send to the second AV. At step 410, the social action selected by the passenger in the first AV is performed at the second AV.

In various examples, social actions can include sending an emoji to the second AV, sending a high five to the second AV, and sending a message to the second AV. In some examples, depending on the social action selected, the social action can be displayed on a screen in the second AV. In some examples, the social action is a light show transmitted from the first AV to the second AV for display in the second AV. A light show can include a sequence of colored lights, and/or patterns of lights that are turned on and off at selected times. In some examples, an AV can include multiple colored LED lights, such as a circle of overhead LED lights around an interior perimeter of the passenger cabin, and these lights can be used to produce a light show. In some examples, the social action is a Walkie-Talkie communication. In some examples, the social action is a suggestion to play a game. Another example of a social action is to send a cool or warm breeze to a passenger in the second AV, wherein the breeze can be delivered via the HVAC system in the second AV.

In some implementations, the social action can be shared in-vehicle features. For example, a passenger in the first AV can share a music selection, a lighting selection, or other interior vehicle personalization settings. In some examples, the passenger from the first AV can request the vehicle personalization settings of the second AV. In some examples, the social action includes a video of the passenger riding in the first AV from the perspective of another AV, and the video is transmitted to the second AV.

In some examples, a social action can be performed at the first AV for a pedestrian or other road user. For example, a voice message can be played on external speakers, and/or external displays can be customized to display selected social action content. In some examples, a walkie-talkie functionality can be enabled, such that the passenger in the first AV can communicate with a pedestrian or other road user outside the first AV, and the pedestrian or other road user can communicate with the passenger in the first AV.

In some implementations, the vehicle socialization platform provides an opportunity for passengers to affect AV driving behavior. For example, at a four-way stop with multiple fleet vehicles, the vehicle socialization platform can offer that the vehicle in which the passenger hits the "go" button first will go first at the intersection. Thus, if a first passenger in a first AV pushes the "go" button before a second passenger in a second AV, the first AV will go first at the four-way stop intersection. In other examples, the vehicle socialization platform can provide the passenger with relevant information, such as "AV2 beat us to the stop by 0.73 seconds-they go first!". In another example, if multiple fleet vehicles are driving together as a group, a passenger can be provided with an opportunity to stay with the group of fleet vehicles or split away from the group. In one example, a passenger can select a preferred lane for the AV to drive in. In another example, a passenger can request a speed boost to the AV speed, and, if the AV is traveling below the speed limit and a speed boost is appropriate, the AV can apply the speed boost.

In some examples, the vehicle socialization platform provides an opportunity for a group of AVs to interact with each other. One AV could initiate an invitation to multiple other AVs within a designated area. In some examples, the multiple other AVs may be driving towards the same destination (e.g., a sports game, a concert, or other event). The AV interactions can provide additional networking and camaraderie during the ride. In some examples, the AV interactions can include shared music, music playlists, trivia, or other games. In some examples, a group of AVs can participate in a scavenger hunt challenge together.

Example Map showing Vehicles for Vehicle Social Actions

Figure 5A:
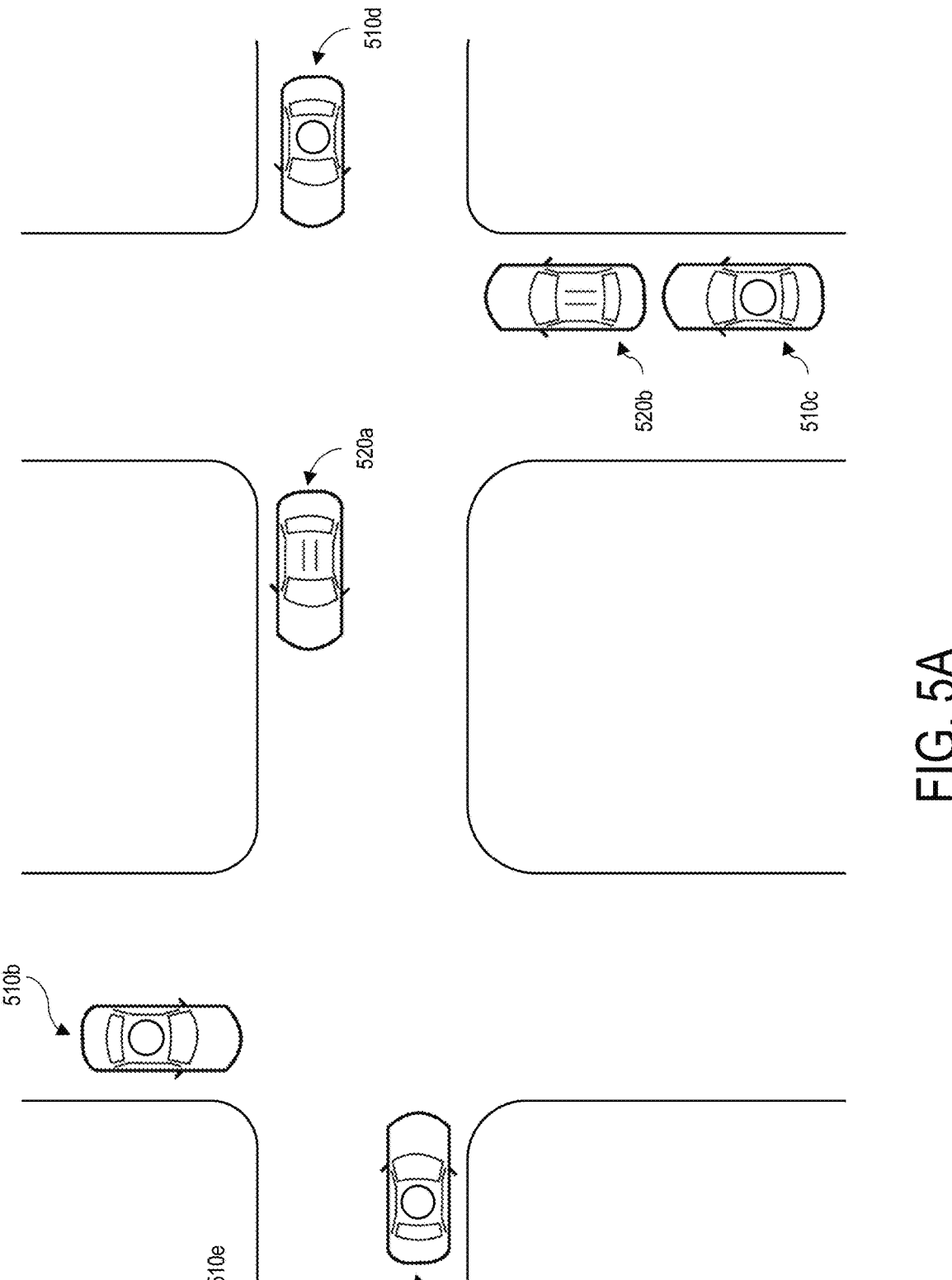
FIG. 5A shows an example of a map showing multiple AVs that can each include a vehicle socialization platform, according to some embodiments of the disclosure.

FIG. 5A shows an example of a map 500 showing multiple AVs 510a-510e that can each include a vehicle socialization platform, and two non-autonomous vehicles 520a, 520b, according to various examples of the present disclosure. In various examples, passengers in each of the AVs 510a-510e can interact with passengers in one or more other AVs 510a-510e via a vehicle socialization platform, depending on each AVs position, proximity, and direction of travel. Thus, for example, the first AV 510a may be able to interact with the second AV 510b and the fourth AV 510d, while the second AV 510b may be able to interact with the first AV 510a and the fifth AV 510e. In various examples, the zone in which an AV can interact with other AVs can vary based on various factors such as traffic, fleet size, and AV speed.

Figure 5B:
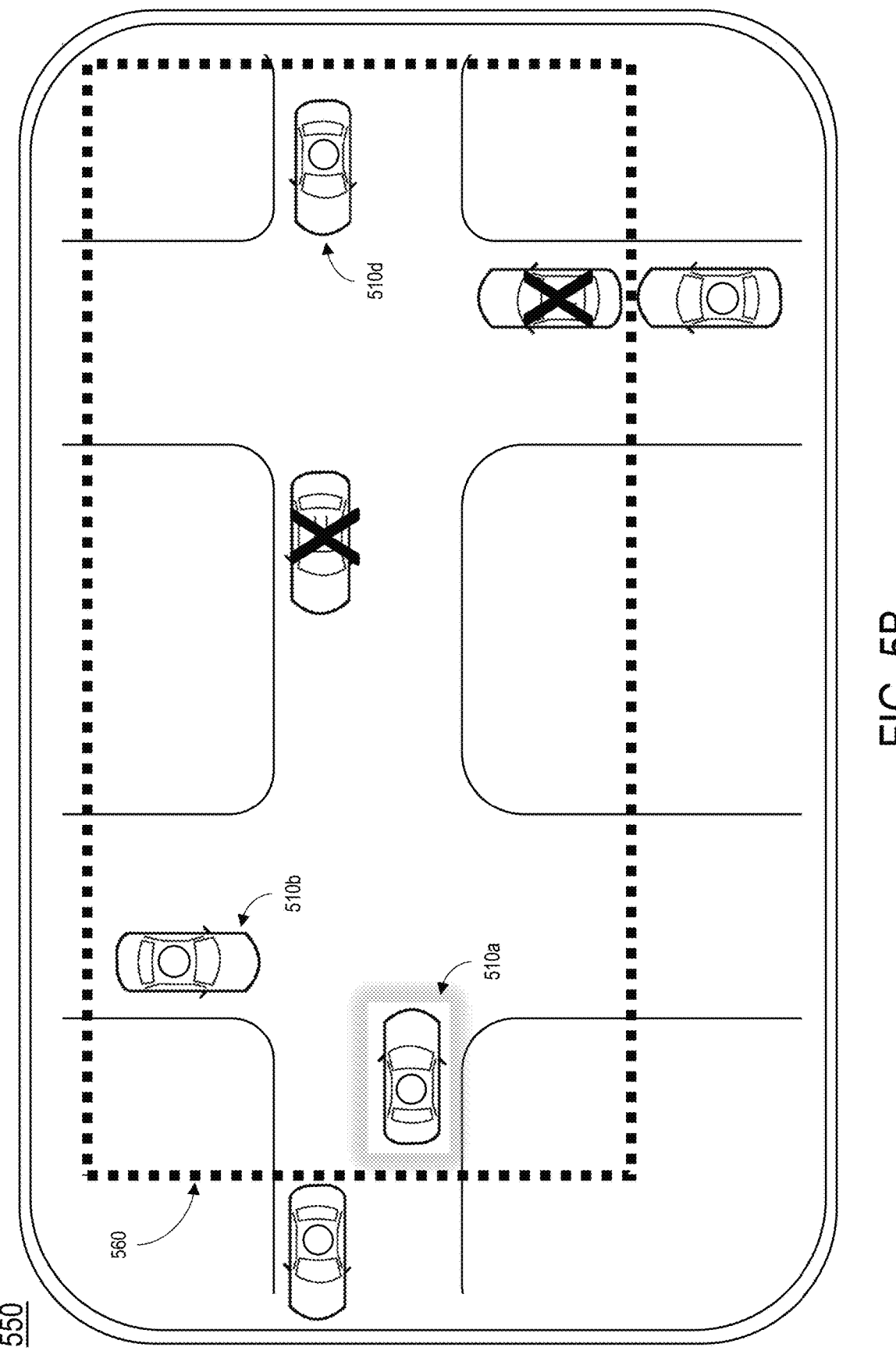
FIG. 5B shows an example of a vehicle socialization platform interface for an AV, showing a map and a highlighted zone, according to some embodiments of the disclosure.

FIG. 5B shows an example of a vehicle socialization platform interface for the first AV 510a, showing a map and a highlighted zone 560, according to various examples of the present disclosure. The first AV 510a is highlighted indicating to a viewer (i.e, the passenger) that this is the AV they are in. The passenger can select another AV in the highlighted zone to interact with. As shown in FIG. 5B, the highlighted zone 560 includes two other AVs—the second AV 510b, and the fourth AV 510d. Thus, in some examples, the passenger in the first AV 510a can select one of the second 510b and fourth 510d AVs to send a social action to. The interface 550 shows the map outside the highlighted zone 560, but in some examples the area outside the highlighted zone 560 can be obscured, either entirely or partially (e.g., with a semi-opaque covering). Additionally, the highlighted zone 560 includes two vehicles that are not fleet AVs, and which cannot be selected for transmitting a social action to. These two vehicles are marked with an "x" on the map. In other implementations, any vehicles that cannot be selected are not shown on the map in the highlighted zone 560. In some implementations, any vehicles that cannot be selected are grayed out and/or semi-transparent on the map.

Example Vehicle Socialization Platform

Figure 6:
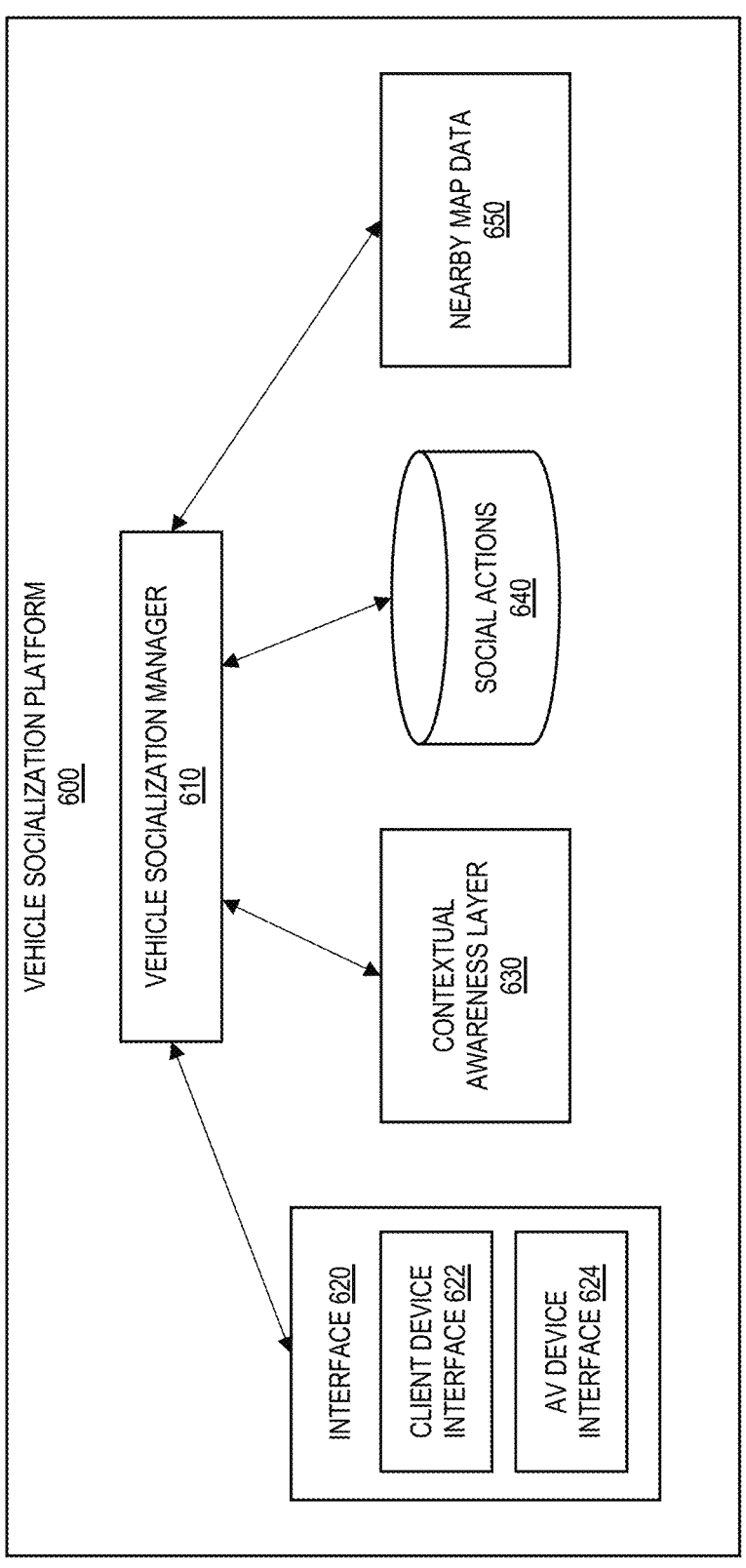
FIG. 6 shows an example of a vehicle socialization platform, according to some embodiments of the present disclosure.

FIG. 6 shows an example of a vehicle socialization platform 600, according to some embodiments of the present disclosure. The vehicle socialization platform 600 can be used for passive communications with other AVs, other AV passengers, and/or other road users. The vehicle socialization platform 600 can be used for active communications with other AVs, other AV passengers, and/or other road users. In some examples, the vehicle socialization platform 600 can be used to implement the method 300 of FIG. 3, and in some examples, the vehicle socialization platform 600 can be used to implement the method 400 of FIG. 4.

The vehicle socialization platform 600 includes a vehicle socialization manager 610 that determines when vehicle socialization is available, identifies the map area and nearby AVs that can interact via the vehicle socialization platform 600, and identifies social actions that can be transmitted to and/or presented to the nearby AVs. Similarly, the vehicle socialization manager can identify other road users and pedestrians that the AV can interact with via the vehicle socialization platform 600.

The vehicle socialization manager 610 can present vehicle socialization options to an interface 620. The interface 620 can be a vehicle socialization app on a mobile device. In some examples, the interface 620 is presented on a client device interface 622, such as on a passenger's mobile device. The interface 620 may only be fully functional and allow vehicle interactions when the client device interface 622 (and thus the passenger's mobile device) is inside the AV. In some examples, the interface 620 is presented on an in-vehicle AV device interface 624, such as on an in-vehicle tablet or screen.

In various examples, the vehicle socialization manager 610 receives information from a contextual awareness layer 630 and, based on the information, dynamically determines when it is appropriate to turn on different types of socialization including multiple various social actions. For instance, on a passenger's first AV ride and/or during a passenger's first several AV rides, the vehicle socialization platform 600 can be turned off, allowing the passenger to focus on AV driving and on the road. After multiple AV rides, and/or with repeated ridership, the vehicle socialization platform 600 can be turned on, beginning with passive communication during the next few rides, and after that, inviting passenger participation and active communication with other passengers and/or other AVs via the vehicle socialization platform 600. In another example, if an AV experiences a hard stop, a swerve, or another on-road challenge, the vehicle socialization platform 600 can suspend its operation for a selected period of time, or the vehicle socialization platform 600 can limit its operation to a limited set of social actions for a selected period of time. Additionally, in some examples, if an AV is in communication with a remote assistant for any reason, the vehicle socialization platform 600 can suspend operation until after the AV is back in operation on the road.

The vehicle socialization manager 610 receives nearby map data 650, including nearby fleet AVs, the location on the map of nearby fleet AVs, and other nearby road users. In some examples, the vehicle socialization platform 600 receives map data including locations of other AVs from a fleet management system. In some examples, the AV the vehicle socialization platform 600 is installed on includes recent map data, and vehicle sensors are used to detect and identify other fleet AVs as well as other road users.

The vehicle socialization manager 610 has access to a database of social actions 640. The vehicle socialization manager 610 can select potential social action options from the database 640 for presentation to a passenger via the interface 620. In particular, based on the context, the nearby map data, and the selected AV to which a social action will be presented, a subset of the social actions in the database 640 can be selected, and a passenger can choose a social action from the subset via the interface 620. In passive communications, in which there is no user input, the vehicle socialization manager 610 can select a social action from the subset based on the contextual information, the map data and the selected AV to which the social action will be presented.

Figure 7:
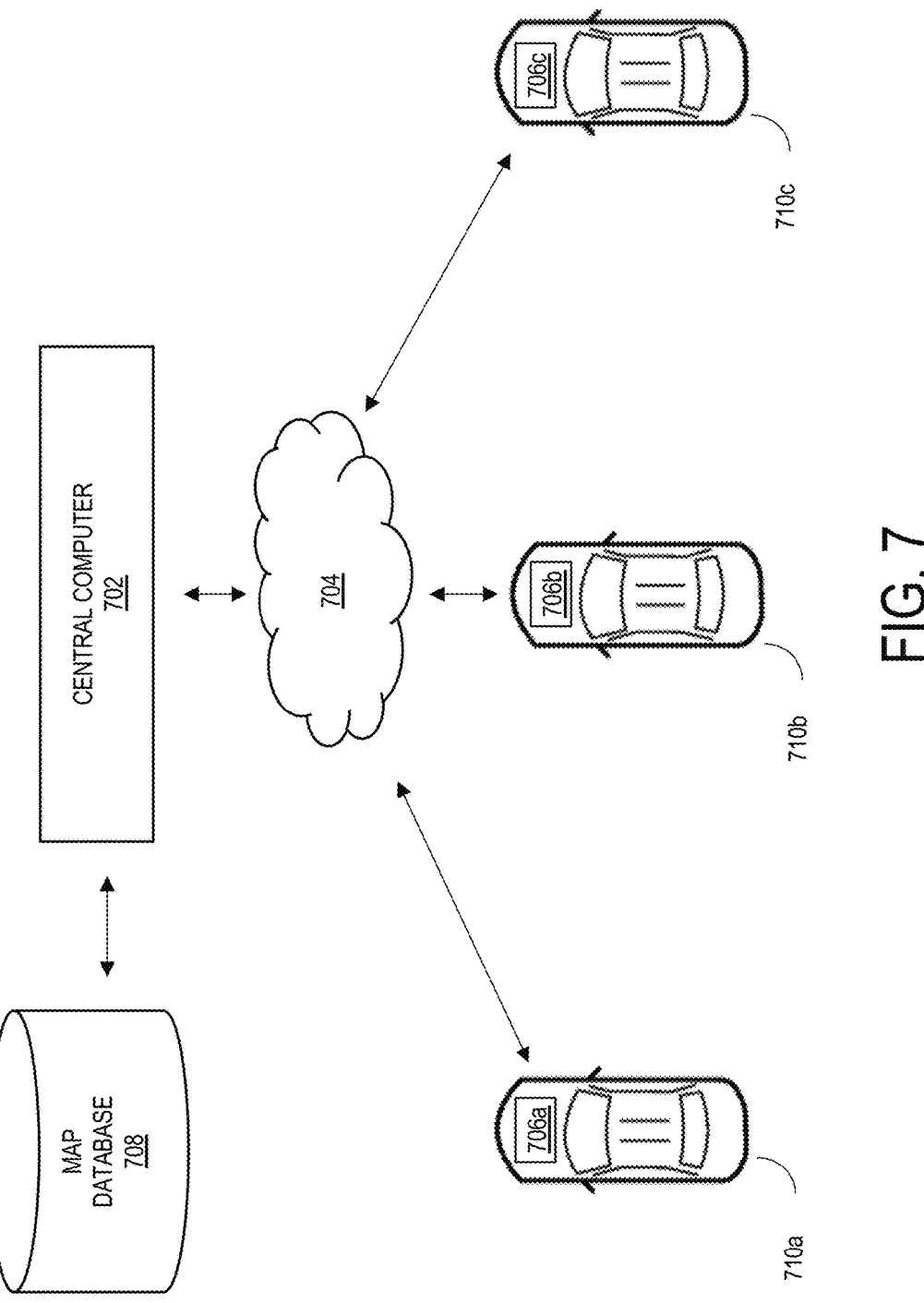
FIG. 7 is a diagram illustrating a fleet of autonomous vehicles in communication with a central computer, according to some embodiments of the disclosure.

Example of an Autonomous Vehicle Fleet System Having Vehicle Socialization Platform FIG. 7 is a diagram 700 illustrating a fleet of autonomous vehicles 710a, 710b, 710c in communication with a central computer 702, according to some embodiments of the disclosure. The vehicles 710a-710c communicate wirelessly with a cloud 704 and a central computer 702. The central computer 702 includes a routing coordinator, a back office/dispatch service 706, and a database of information from the vehicles 710a-710c in the fleet. In some examples, the central computer 702 includes the fleet management service. Autonomous vehicle fleet routing refers to the routing of multiple vehicles in a fleet. In some implementations, the autonomous vehicles 710a, 710b, 710c communicate directly with each other. In some examples, the autonomous vehicles 710a, 710b, 710c each include a vehicle socialization platform 706a, 706b, 706c, respectively, and the vehicles 710a, 710b, 710c communicate with each other via their respective vehicle socialization platforms 706a, 706b, 706c. Each received ride request can be assigned, by the central computer 702, to a vehicle 710a-710c in the fleet.

The central computer 702 also acts as a centralized ride management system and CAN communicates with ridehail applications via a ridehail service. In various examples, the ridehail service includes a rideshare service (and rideshare users) as well as an autonomous vehicle delivery service. Via the ridehail service, the central computer 702 receives ride requests from various user ridehail applications. The central computer 702 also receives location information for the mobile device on which the ridehail application is installed. In some implementations, the ride requests include a pick-up location, a drop-off location, and/or an intermediate stopping location.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns.

Example Autonomous Vehicle Management System

Figure 8:
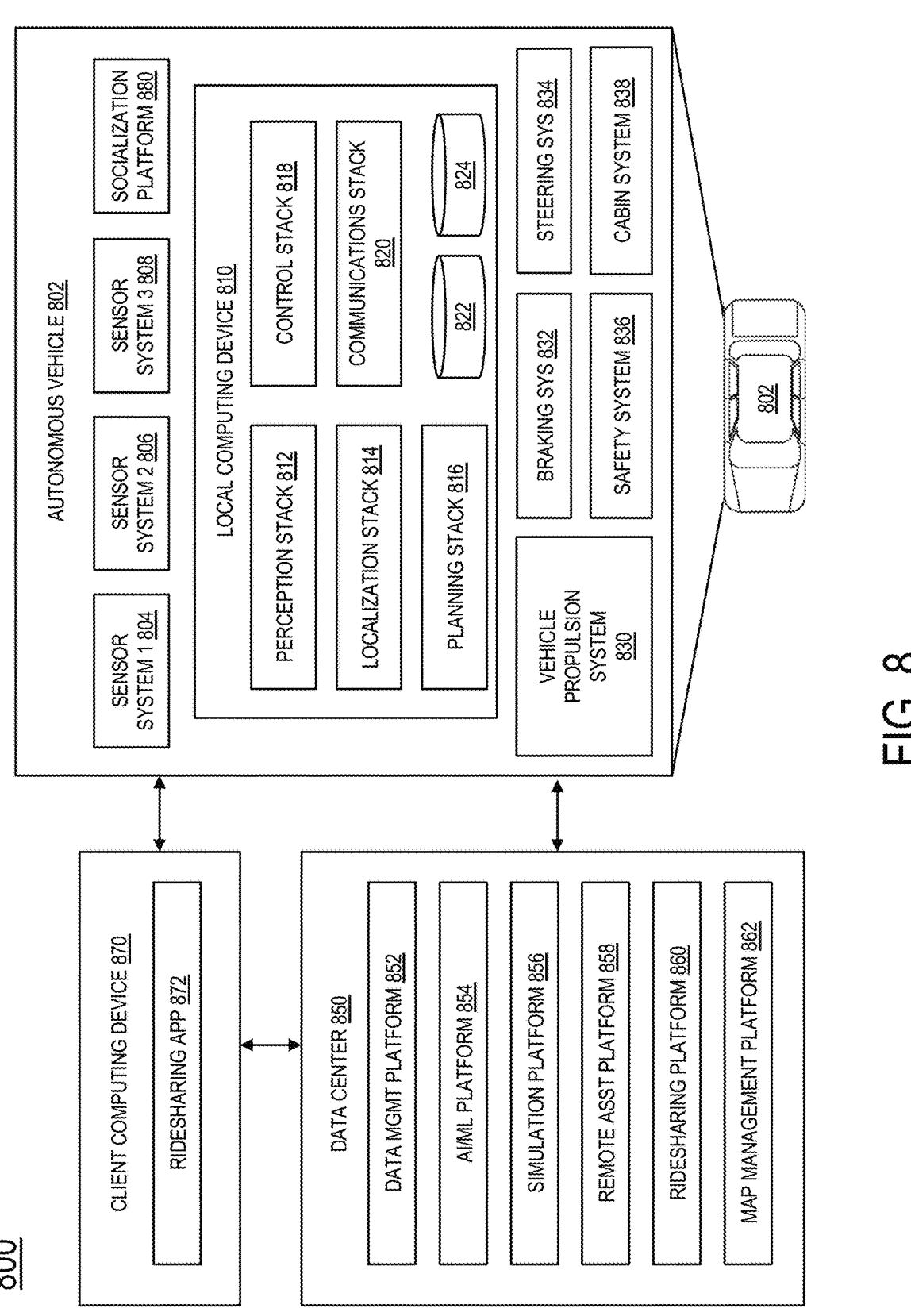
FIG. 8 illustrates an example system environment that can be used to facilitate autonomous vehicle (AV) dispatch and operations, according to some aspects of the disclosed technology.

Turning now to FIG. 8, this figure illustrates an example of an AV management system 800. One of ordinary skill in the art will understand that, for the AV management system 800 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, the data center 850, and the client computing device 870 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In various examples, the AV management system 800 can be used to control an autonomous vehicle to pick up and/or drop off a user or delivery.

AV 802 can navigate about roadways without a human driver based on sensor signals generated by multiple sensor systems 804, 806, and 808. The sensor systems 804-808 can include different types of sensors and can be arranged about the AV 802. For instance, the sensor systems 804-808 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 can be a camera system, the sensor system 806 can be a LIDAR system, and the sensor system 808 can be a RADAR system. Other embodiments may include any other number and type of sensors. The AV 802 can also include a vehicle socialization platform 880 to generate social actions for the AV 802 to transmit and/or perform, as described herein.

AV 802 can also include several mechanical systems that can be used to maneuver or operate AV 802. For instance, the mechanical systems can include vehicle propulsion system 830, braking system 832, steering system 834, safety system 836, and cabin system 838, among other systems. Vehicle propulsion system 830 can include an electric motor, an internal combustion engine, or both. The braking system 832 can include an engine brake, a wheel braking system (e.g., a disc braking system that utilizes brake pads), hydraulics, actuators, and/or any other suitable componentry configured to assist in decelerating AV 802. The steering system 834 can include suitable componentry configured to control the direction of movement of the AV 802 during navigation. Safety system 836 can include lights and signal indicators, a parking brake, airbags, and so forth. The cabin system 838 can include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 can include one or more client interfaces (e.g., Graphical User Interfaces (GUIs), Voice User Interfaces (VUIs), etc.) for controlling certain aspects of the mechanical systems 830-838.

AV 802 can additionally include a local computing device 810 that is in communication with the sensor systems 804-808, the mechanical systems 830-838, the data center 850, and the client computing device 870, among other systems. The local computing device 810 can include one or more processors and memory, including instructions that can be executed by the one or more processors. The instructions can make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, a High Definition (HD) geospatial database 822, and an AV operational database 824, among other stacks and systems.

Perception stack 812 can enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 can detect and classify objects and determine their current and predicted locations, speeds, directions, and the like. In addition, the perception stack 812 can determine the free space around the AV 802 (e.g., to maintain a safe distance from other objects, change lanes, park the AV, etc.). The perception stack 812 can also identify environmental uncertainties, such as where to look for moving objects, flag areas that may be obscured or blocked from view, and so forth. The perception stack 812 can be used in sentinel mode to sense the vehicle environment and identify objects.

Mapping and localization stack 814 can determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 can compare sensor data captured in real-time by the sensor systems 804-808 to data in the HD geospatial database 822 to determine its precise (e.g., accurate to the order of a few centimeters or less) position and orientation. The AV 802 can focus its search based on sensor data from one or more first sensor systems (e.g., GPS) by matching sensor data from one or more second sensor systems (e.g., LIDAR). If the mapping and localization information from one system is unavailable, the AV 802 can use mapping and localization information from a redundant system and/or from remote data sources.

The planning stack 816 can determine how to maneuver or operate the AV 802 safely and efficiently in its environment. For example, the planning stack 816 can receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 802 from one point to another. The planning stack 816 can determine multiple sets of one or more mechanical operations that the AV 802 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 can select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 can manage the operation of the vehicle propulsion system 830, the braking system 832, the steering system 834, the safety system 836, and the cabin system 838. The control stack 818 can receive sensor signals from the sensor systems 804-808 as well as communicate with other stacks or components of the local computing device 810 or a remote system (e.g., the data center 850) to effectuate operation of the AV 802. For example, the control stack 818 can implement the final path or actions from the multiple paths or actions provided by the planning stack 816. This can involve turning the routes and decisions from the planning stack 816 into commands for the actuators that control the AV's steering, throttle, brake, and drive unit.

The communication stack 820 can transmit and receive signals between the various stacks and other components of the AV 802 and between the AV 802, the data center 850, the client computing device 870, and other remote systems. The communication stack 820 can enable the local computing device 810 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 820 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 822 can store HD maps and related data of the streets upon which the AV 802 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes. The maps and data stored in the HD geospatial database 822 can include HD maps and/or data related to a user's visit history, including data on various map sections the user has visited, sections the user has not yet visited, and sections the user has not yet visited and where proposed destinations are located, as described above with respect to FIGS. 3A-3C.

The AV operational database 824 can store raw AV data generated by the sensor systems 804-808 and other components of the AV 802 and/or data received by the AV 802 from remote systems (e.g., the data center 850, the client computing device 870, etc.). In some embodiments, the raw AV data can include HD LIDAR point cloud data, image or video data, RADAR data, GPS data, and other sensor data that the data center 850 can use for creating or updating AV geospatial data as discussed further below with respect to FIG. 5 and elsewhere in the present disclosure.

The data center 850 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 850 can include one or more computing devices remote to the local computing device 810 for managing a fleet of AVs and AV-related services. For example, in addition to managing the AV 802, the data center 850 may also support a ridesharing service, a delivery service, a remote/roadside assistance service, street services (e.g., street mapping, street patrol, street cleaning, street metering, parking reservation, etc.), and the like.

The data center 850 can send and receive various signals to and from the AV 802 and the client computing device 870. These signals can include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing platform 860, and a map management platform 862, among other systems.

Data management platform 852 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 can access data stored by the data management platform 852 to provide their respective services.

The AI/ML platform 854 can provide the infrastructure for training and evaluating machine learning algorithms for operating the AV 802, the simulation platform 856, the remote assistance platform 858, the ridesharing platform 860, the map management platform 862, and other platforms and systems. Using the AI/ML platform 854, data scientists can prepare data sets from the data management platform 852; select, design, and train machine learning models; evaluate, refine, and deploy the models; maintain, monitor, and retrain the models; and so on.

The simulation platform 856 can enable testing and validation of the algorithms, machine learning models, neural networks, and other development efforts for the AV 802, the remote assistance platform 858, the ridesharing platform 860, the map management platform 862, and other platforms and systems. The simulation platform 856 can replicate a variety of driving environments and/or reproduce real-world scenarios from data captured by the AV 802, including rendering geospatial information and road infrastructure (e.g., streets, lanes, crosswalks, traffic lights, stop signs, etc.) obtained from the map management platform 862; modeling the behavior of other vehicles, bicycles, pedestrians, and other dynamic elements; simulating inclement weather conditions, different traffic scenarios; and so on.

The remote assistance platform 858 can generate and transmit instructions regarding the operation of the AV 802. For example, in response to an output of the AI/ML platform 854 or other system of the data center 850, the remote assistance platform 858 can prepare instructions for one or more stacks or other components of the AV 802.

The ridesharing platform 860 can interact with a customer of a ridesharing service via a ridesharing application 872 executing on the client computing device 870. The client computing device 870 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 872. The client computing device 870 can be a customer's mobile computing device or a computing device integrated with the AV 802 (e.g., the local computing device 810). The ridesharing platform 860 can receive requests to be picked up or dropped off from the ridesharing application 872 and dispatch the AV 802 for the trip.

Map management platform 862 can provide a set of tools for the manipulation and management of geographic and spatial (geospatial) and related attribute data. The data management platform 852 can receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data can be processed, and map management platform 862 can render base representations (e.g., tiles (2D), bounding volumes (3D), etc.) of the AV geospatial data to enable users to view, query, label, edit, and otherwise interact with the data. Map management platform 862 can manage workflows and tasks for operating on the AV geospatial data. Map management platform 862 can control access to the AV geospatial data, including granting or limiting access to the AV geospatial data based on user-based, role-based, group-based, task-based, and other attribute-based access control mechanisms. Map management platform 862 can provide version control for the AV geospatial data, such as to track specific changes that (human or machine) map editors have made to the data and to revert changes when necessary. Map management platform 862 can administer release management of the AV geospatial data, including distributing suitable iterations of the data to different users, computing devices, AVs, and other consumers of HD maps. Map management platform 862 can provide analytics regarding the AV geospatial data and related data, such as to generate insights relating to the throughput and quality of mapping tasks.

In some embodiments, the map viewing services of map management platform 862 can be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing platform 860 may incorporate the map viewing services into the client application 872 to enable passengers to view the AV 802 in transit en route to a pick-up or drop-off location, and so on.

Figure 9:
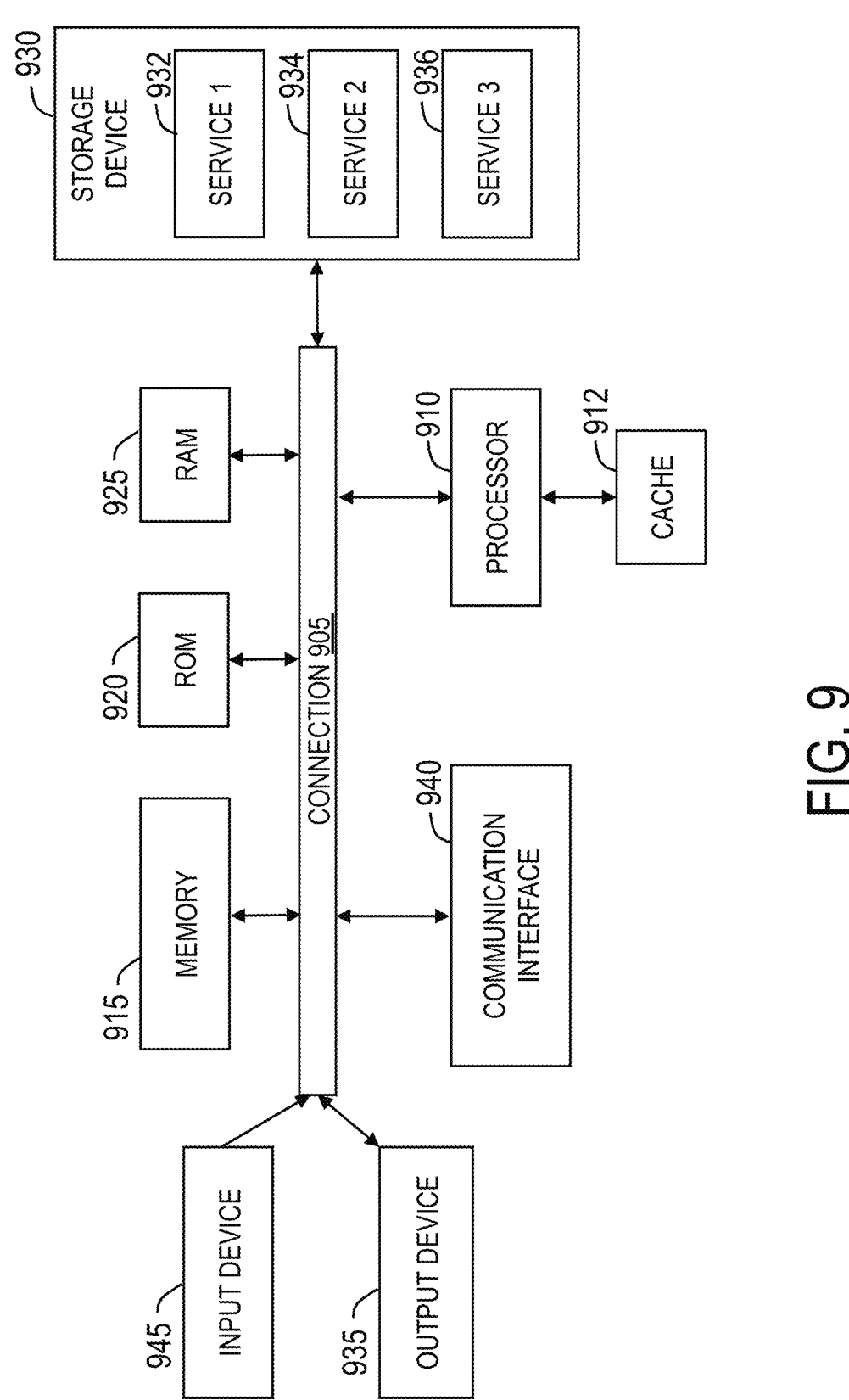
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric. In some examples, the processor 910 is an image processor that can process images from vehicle image sensors. In some examples, the processor 910 can determine a sensor field of view. In some examples, the processor 910 can stitch together captured images from adjacent image sensors.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an iBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a system for vehicle socialization, comprising: a fleet of autonomous vehicles, including a first autonomous vehicle and a second autonomous vehicle, wherein the first autonomous vehicle includes a vehicle socialization platform including a set of social actions and configured to: determine the second autonomous vehicle is within a selected distance of the first autonomous vehicle, determine, based on vehicle sensor data from external vehicle sensors, that the first autonomous vehicle is visible from the second autonomous vehicle, select a social action from the set of social actions to perform on an exterior of the first autonomous vehicle, receive passenger input regarding the social action, update the social action based on the passenger input, and perform the updated social action on the exterior of the first autonomous vehicle; and a central computing system configured to: track the fleet of autonomous vehicles on a map, and transmit local map data including nearby autonomous vehicle location data to the first autonomous vehicle.

Example 2 provides a method, system, and/or vehicle according to one or more of the preceding and/or following examples, wherein the vehicle socialization platform is further configured to transmit a map to a device interface, wherein the map includes a zone within the selected distance around the first autonomous vehicle, and wherein the map shows the second autonomous vehicle and other vehicles in the zone.

Example 3 provides a method, system, and/or vehicle according to one or more of the preceding and/or following examples, wherein the device interface is an interface on a mobile device, wherein the map is displayed in the device interface, and wherein the device interface is configured to receive user input.

Example 4 provides a method, system, and/or vehicle according to one or more of the preceding and/or following examples, wherein the mobile device is one of a user mobile device and an in-vehicle tablet.

Example 5 provides a method, system, and/or vehicle according to one or more of the preceding and/or following examples, wherein the central computing system is further configured to transmit nearby autonomous vehicle planned route data including a path of the second autonomous vehicle, and wherein the vehicle socialization platform is further configured to identify a time to perform the updated social action based on the path of the second autonomous vehicle and a first autonomous vehicle path.

Example 6 provides a method, system, and/or vehicle according to one or more of the preceding and/or following examples, wherein the social action is one of waving windshield wipers on the first autonomous vehicle, flashing light of the first autonomous vehicle, and displaying a hand waving animation on an exterior display of the first autonomous vehicle.

Example 7 provides a method, system, and/or vehicle according to one or more of the preceding and/or following examples, wherein the social action includes playing a first series of audible chimes and wherein the second autonomous vehicle is configured to play a second series of audible chimes and wherein chimes of the first series of audible chimes alternate with chimes of the second series of audible chimes, and wherein the alternating first series and second series together create a song.

Example 8 provides a method, system, and/or vehicle according to one or more of the preceding and/or following examples, wherein the vehicle socialization platform is further configured to define an interactivity zone around the first autonomous vehicle, wherein the first autonomous vehicle can perform the updated social action on vehicles in the interactivity zone.

Example 9 provides a method, system, and/or vehicle according to one or more of the preceding and/or following examples, wherein the vehicle socialization platform is further configured to transmit the updated social action to an interior cabin of the second autonomous vehicle.

Example 10 provides an autonomous vehicle for vehicle socialization, comprising: a sensor suite including a plurality of external sensors to generate sensor data; an onboard computer configured to receive routing instructions and control the autonomous vehicle to drive along a route, and to receive the sensor data and detect other road users; and a vehicle socialization platform including: a plurality of social actions, a contextual awareness module, and a database of nearby map data, and configured to: determine a second fleet vehicle is within a selected distance of the autonomous vehicle determine, based on the sensor data, that the autonomous vehicle is visible from the second fleet vehicle, select a first social action from the plurality of social actions to perform, receive passenger input regarding the first social action, update the first social action based on the passenger input, and perform the updated first social action.

Example 11 provides a method, system, and/or vehicle according to one or more of the preceding and/or following examples, wherein the vehicle socialization platform is further configured to transmit a map to a device interface, wherein the map includes a zone within the selected distance around the first autonomous vehicle, and wherein the map shows the second fleet vehicle and other vehicles in the zone.

Example 12 provides a method, system, and/or vehicle according to one or more of the preceding and/or following examples, wherein the device interface is an interface on a mobile device, wherein the map is displayed in the device interface, and wherein the device interface is configured to receive user input.

Example 13 provides a method, system, and/or vehicle according to one or more of the preceding and/or following examples, wherein the vehicle socialization platform is further configured to: receive nearby fleet vehicle planned route data including a path of the second fleet vehicle, and identify a time to perform the updated first social action based on the path of the second fleet vehicle and the route of the autonomous vehicle.

Example 14 provides a method, system, and/or vehicle according to one or more of the preceding and/or following examples, wherein the social action is one of waving windshield wipers on the first autonomous vehicle, flashing light of the first autonomous vehicle, and displaying a hand waving animation on an exterior display of the first autonomous vehicle.

Example 15 provides a method, system, and/or vehicle according to one or more of the preceding and/or following examples, wherein the vehicle socialization platform is further configured to define an interactivity zone around the autonomous vehicle, wherein the autonomous vehicle can perform the updated first social action on vehicles in the interactivity zone.

Example 16 provides a method, system, and/or vehicle according to one or more of the preceding and/or following examples, wherein the vehicle socialization platform is further configured to transmit the updated first social action to an interior cabin of the second fleet vehicle.

Example 17 provides a method for vehicle socialization, comprising: transmitting local map data including nearby fleet vehicle location data to a first autonomous vehicle; determining, at the first autonomous vehicle, that a second fleet vehicle is within a selected distance of the first autonomous vehicle; determining, based on vehicle sensor data from external vehicle sensors on the first autonomous vehicle, that the first autonomous vehicle is visible from the second fleet vehicle; selecting, at the first autonomous vehicle, a social action from a set of social actions; receiving passenger input regarding the social action from a passenger in the first autonomous vehicle; updating the social action based on the passenger input; and performing the updated social action on an exterior of the first autonomous vehicle.

Example 18 provides a method, system, and/or vehicle according to one or more of the preceding and/or following examples, further comprising transmitting a map to a device interface and displaying the map in the device interface, wherein the map includes a zone within the selected distance around the first autonomous vehicle, and wherein the map shows the second fleet vehicle and other vehicles in the zone.

Example 19 provides a method, system, and/or vehicle according to one or more of the preceding and/or following examples, wherein receiving passenger input regarding the social action further includes receiving passenger input from the device interface.

Example 20 provides a method, system, and/or vehicle according to one or more of the preceding and/or following examples, receiving nearby fleet vehicle planned route data including a path of the second fleet vehicle, and identifying a time to perform the updated social action based on the path of the second fleet vehicle and the route of the first autonomous vehicle.

Example 21 provides a computer-readable medium for performing the method of any of the examples 1-20.

Example 22 includes an apparatus comprising means for performing the method of any of the examples 1-20.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system for vehicle socialization, comprising:
a fleet of autonomous vehicles, including a first autonomous vehicle and a second autonomous vehicle, wherein the first autonomous vehicle includes a vehicle socialization platform including a set of social actions and configured to:
define a temporary interactivity zone around the first autonomous vehicle that moves with the first autonomous vehicle as the first autonomous vehicle drives;
determine the second autonomous vehicle is within the temporary interactivity zone;
display a map on a device interface showing the first autonomous vehicle, the temporary interactivity zone, and the second autonomous vehicle within the temporary interactivity zone, the map configured to receive a passenger selection of the second autonomous vehicle;
determine, based on vehicle sensor data from external vehicle sensors, that the first autonomous vehicle is visible from the second autonomous vehicle;
select a first social action from the set of social actions;
receive passenger input in response to the selected first social action;
update the selected first social action in response to the passenger input; and
perform the updated first social action on an exterior of the first autonomous vehicle; and
a central computing system configured to:
track the fleet of autonomous vehicles on a map; and
transmit local map data including nearby autonomous vehicle location data to the first autonomous vehicle.

2. The system of claim 1, wherein the vehicle socialization platform is further configured to transmit the map to the device interface, wherein the temporary interactivity zone includes a zone within a selected distance around the first autonomous vehicle.

3. The system of claim 2, wherein the device interface is an interface on a mobile device, wherein the map is displayed in the device interface, and wherein the device interface is configured to receive the passenger selection.

4. The system of claim 3, wherein the mobile device is one of a user mobile device and an in-vehicle tablet.

5. The system of claim 1, wherein the central computing system is further configured to transmit nearby autonomous vehicle planned route data including a path of the second autonomous vehicle, and wherein the vehicle socialization platform is further configured to identify a time to perform the updated social action based on the path of the second autonomous vehicle and a first autonomous vehicle path.

6. The system of claim 1, wherein the social action is one of waving windshield wipers on the first autonomous vehicle, flashing a light of the first autonomous vehicle, and displaying a hand waving animation on an exterior display of the first autonomous vehicle.

7. The system of claim 1, wherein the social action includes playing a first series of audible chimes and wherein the second autonomous vehicle is configured to play a second series of audible chimes and wherein chimes of the first series of audible chimes alternate with chimes of the second series of audible chimes, and wherein the alternating first series and second series together create a song.

8. The system of claim 1, wherein the first autonomous vehicle can perform the updated social action on vehicles in the temporary interactivity zone.

9. The system of claim 1, wherein the vehicle socialization platform is further configured to transmit the updated social action to an interior cabin of the second autonomous vehicle.

10. An autonomous vehicle for vehicle socialization, comprising:

a sensor suite including a plurality of external sensors to generate sensor data;

an onboard computer configured to receive routing instructions and control the autonomous vehicle to drive along a route, and to receive the sensor data and detect other road users; and a vehicle socialization platform including:

a plurality of social actions;

a contextual awareness module; and a database of nearby map data;

and configured to:

define a temporary interactivity zone around the autonomous vehicle that moves with the autonomous vehicle as the autonomous vehicle drives;

determine a second fleet vehicle is within the temporary interactivity zone based on the database of nearby map data;

display a map on a device interface showing the autonomous vehicle, the temporary interactivity zone, and the second fleet vehicle within the temporary interactivity zone, the map configured to receive a passenger selection of the second fleet vehicle;

determine, based on the sensor data, that the autonomous vehicle is visible from the second fleet vehicle;

select a first social action from the plurality of social actions to perform;

receive passenger input in response to the selected first social action;

update the first social action based on the passenger input; and perform the updated first social action.

11. The autonomous vehicle of claim 10, wherein the vehicle socialization platform is further configured to transmit the map to the device interface, wherein the map includes a zone within a selected distance around the autonomous vehicle.

12. The autonomous vehicle of claim 11, wherein the device interface is an interface on a mobile device, wherein the map is displayed in the device interface, and wherein the device interface is configured to receive the passenger selection.

13. The autonomous vehicle of claim 10, wherein the vehicle socialization platform is further configured to:

receive nearby fleet vehicle planned route data including a path of the second fleet vehicle, and identify a time to perform the updated first social action based on the path of the second fleet vehicle and the route of the autonomous vehicle.

14. The autonomous vehicle of claim 10, wherein the social action is one of waving windshield wipers on the autonomous vehicle, flashing a light of the autonomous vehicle, and displaying a hand waving animation on an exterior display of the autonomous vehicle.

15. The autonomous vehicle of claim 10, wherein the autonomous vehicle can perform the updated first social action on vehicles in the temporary interactivity zone.

16. The autonomous vehicle of claim 10, wherein the vehicle socialization platform is further configured to transmit the updated first social action to an interior cabin of the second fleet vehicle.

17. A method for vehicle socialization, comprising:

receiving local map data including nearby fleet vehicle location data at a first autonomous vehicle;

defining, at the first autonomous vehicle, a temporary interactivity zone around the first autonomous vehicle that moves with the first autonomous vehicle while the first autonomous vehicle drives;

determining, at the first autonomous vehicle, that a second fleet vehicle is within the temporary interactivity zone;

displaying a map on a device interface showing the first autonomous vehicle, the temporary interactivity zone, and the second fleet vehicle, the device interface configured to receive a passenger selection of the second fleet vehicle;

determining, based on vehicle sensor data from external vehicle sensors on the first autonomous vehicle, that the first autonomous vehicle is visible from the second fleet vehicle;

selecting, at the first autonomous vehicle, a first social action from a set of social actions;

receiving passenger input in response to the first social action from a passenger in the first autonomous vehicle;

updating the first social action based on the passenger input; and performing the updated social action on an exterior of the first autonomous vehicle.

18. The method of claim 17, further comprising transmitting the map to the device interface and displaying the map in the device interface, wherein the map includes a zone within a selected distance around the first autonomous vehicle.

19. The method of claim 18, wherein receiving the passenger input regarding the social action further includes receiving the passenger input from the device interface.

20. The method of claim 17, further comprising:

receiving nearby fleet vehicle planned route data including a path of the second fleet vehicle, and identifying a time to perform the updated social action based on the path of the second fleet vehicle and the route of the first autonomous vehicle.

\* \* \* \* \*